Aug. 18, 1964   C. J. HARRISON ETAL   3,145,044
CAMPER
Filed Oct. 15, 1962   2 Sheets-Sheet 1

INVENTORS
CHARLES J. HARRISON
BY ERNEST S. FRIDLEY

Eckhoff & Slick
ATTORNEYS

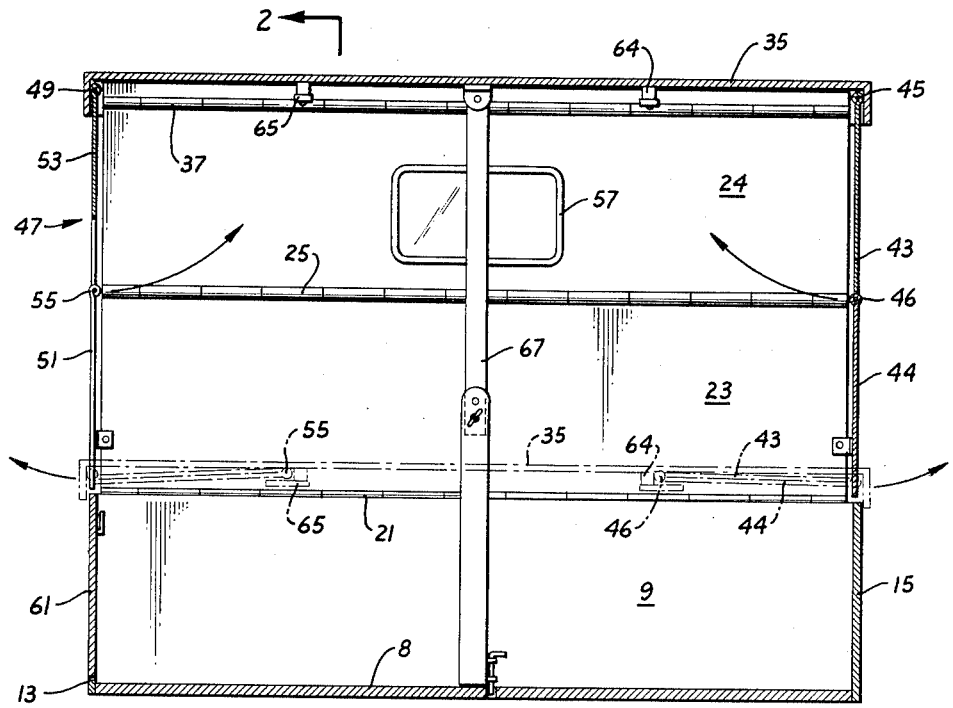
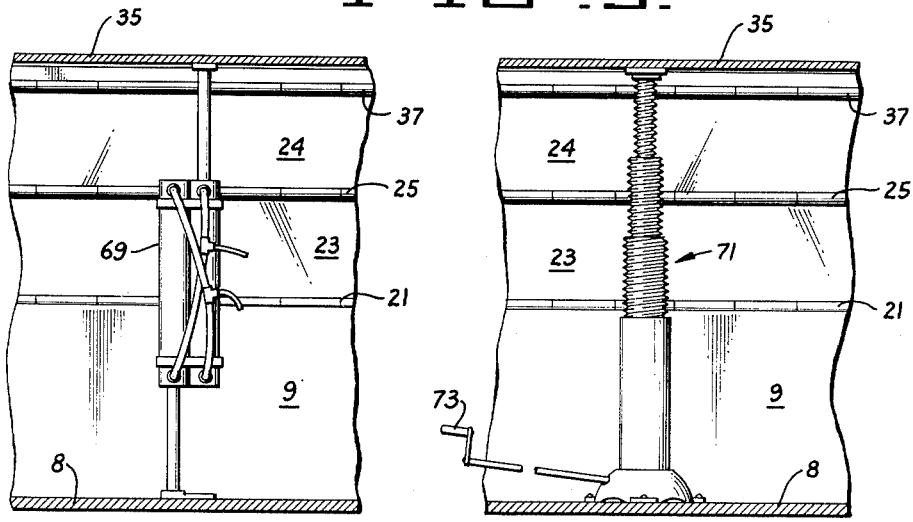
FIG.3.
FIG.4.   FIG.5.
INVENTORS
CHARLES J. HARRISON
BY ERNEST S. FRIDLEY
*Eckhoff & Slick*
ATTORNEYS

United States Patent Office 3,145,044
Patented Aug. 18, 1964

3,145,044
CAMPER
Charles J. Harrison, Box 5, Ben Lomond, Calif., and Ernest S. Fridley, 22625 E. Cliffs Drive, Santa Cruz, Calif.
Filed Oct. 15, 1962, Ser. No. 230,600
2 Claims. (Cl. 296—23)

This invention relates to a camping body adapted for use with pick-up trucks or similar vehicles, commonly known as a "camper."

Campers have heretofore been proposed which are rigid structures but they are extremely heavy and difficult to put on or remove from the vehicle. Further, such rigid structures ordinarily extend above the normal cab of the vehicle so that they are unsuitable for use by sportsmen and the like who traverse brush country, particularly country with overhanging trees and the like. Other campers have been proposed having telescoping walls but these structures are also heavy and expensive and ordinarily do not extend to the full width of the vehicle. Still other structures have soft walls and are relatively ineffective from a comfort standpoint.

It is an object for the present invention to provide a camper body which is extendible to a height higher than that of the cab of a vehicle so that there is adequate room inside, yet which can be lowered to a position wherein the camper does not occupy much more space than the truck body itself.

Another object of this invention is to provide a camper having rigid walls, which walls are provided with accordion folds so that the top of the camper can be brought into a position adjacent the truck body.

Another object of this invention is to provide a camper which is light in weight, inexpensive and easy to erect and lower.

Other objects will be apparent from the balance of the specification which follows.

In the drawings forming a part of this application:

FIGURE 3 is a side sectional view of the camper on the lines 3—3 of FIGURE 2.

FIGURE 4 is a partial side sectional view of the camper showing a fluid assembly for raising the top.

FIGURE 5 is a view similar to FIGURE 4 showing a screw jack for raising the top.

Figure 1:
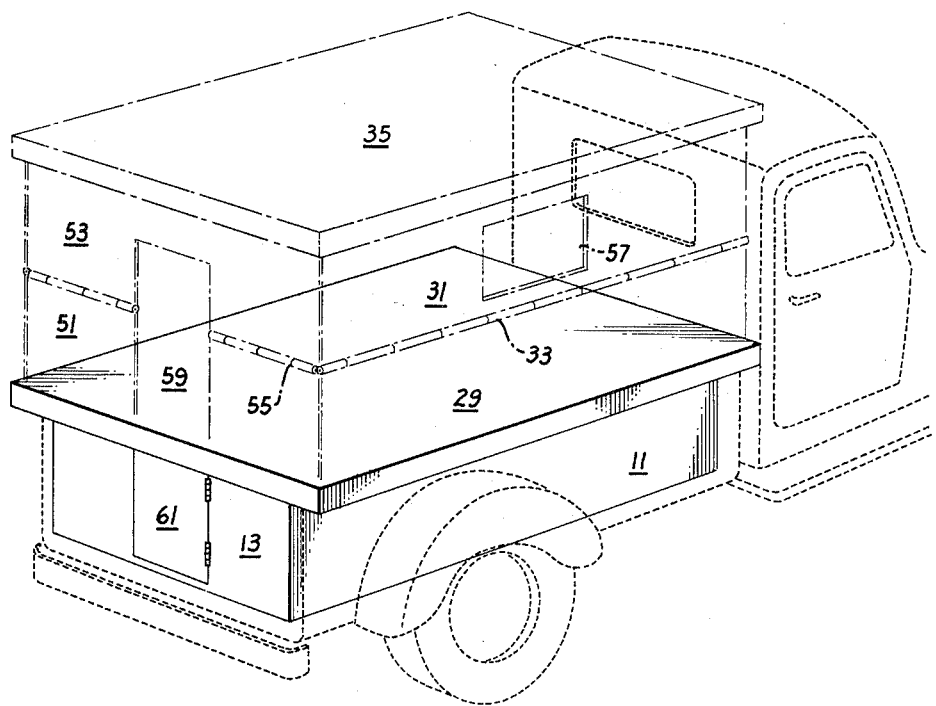
FIGURE 1 is a perspective view of a camper embodying the present invention, the camper being shown in solid lines in the retracted position and in dot-dash lines in the raised or extended position. A partial view of a pick-up truck suitable for use with the camper is shown in dotted lines.

Referring now to the drawings by reference characters, there is shown a camper having a base portion generally designated 7. The base portion is a box-like structure having a bottom 8, side members 9 and 11, a back member 13 and a front member 15. The side members 9 and 11 have extensions 17 and 19 respectively extending outwardly to the sides, the extensions 17 and 19 generally conforming to the sides of the vehicle with which the device is used. The sides of the extendible portion of the camper are formed from a plurality of panels and, in the embodiment shown, two panels form each side. Further, the panels themselves are connected to each other and to the top and base by means of hinges so that the panels can be folded inwardly. Thus, the hinge 21 located at the outer extremity of the member 17 connects the panel 23 while the upper panel 24 is connected to panel 23 by means of hinge 25. Similarly, on the opposite side of the vehicle, a hinge 27 connects the lower panel 29 to the member 19 while the upper panel 31 is connected to the lower panel by means of hinge 33. A solid top 35 is employed and this is connected to the side panels 24 and 31 by the hinges 37 and 39 respectively. Preferably the top has downturned edges 41 extending beyond the hinges to make the structure weatherproof regardless of whether the top is in the extended or retracted position.

In addition to the side panels described, end members are also provided. Thus, the front member is composed of an upper panel 43 and lower panel 44 connected by hinge 46 while the upper panel is connected by hinge 45 to the top 35 at the front thereof. The rear member, generally designated 47, is connected to the back of the top by means of hinge 49. Similarly, the rear panel 47 is made in two portions, namely, a lower portion 51 and an upper portion 53 connected by means of the hinge 55. All of the hinges heretofore described are preferably the length of the panel involved and of the type commonly known as piano hinges. However, several sets of individual hinges could be used rather than the more expensive long hinges.

Various openings can be provided in the various walls described. For instance, the upper panel may have windows as at 57 while the back panel preferably has a door 59. A corresponding door 61 can also be provided in the end 13 of the base member 7. The door 61 provides access to the contents of the camper in addition to actuating the raising and lowering mechanism while the top is in a down position. When the top is in the extended position, it forms a continuation of the door 59 for access to the inside of the camper.

Figure 2:
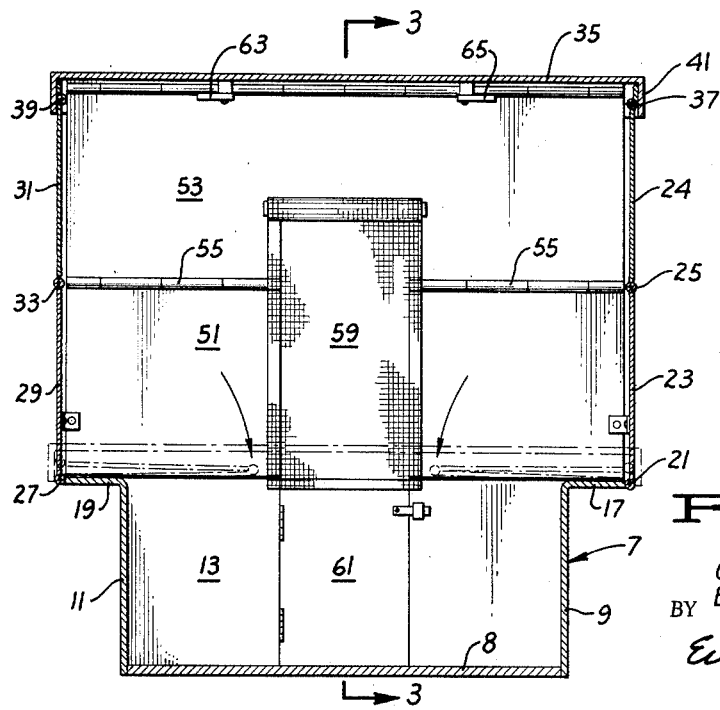
FIGURE 2 is an end sectional view of the camper on the lines 2—2 of FIGURE 3.

When it is desired to lower the device, the front panels are swung together by pulling hinge 46 to the rear and both are then swung against the top and held by means of clamp 64. The back member 47, if made in two pieces, is first folded by folding the panel 51 up over the panel 53 and the two panels then swung back on the hinge 49 so that they lie against the roof 35. The back panel may be held by means of the clamps 63 and 65. These movements are shown by the arrows on FIGURE 3. The top is then lowered by pushing the side panels inwardly so that the side panels fold together on the hinges 25 and 33 and lie in side-by-side arrangement with the top 35 covering the structure as is shown in dot-dash lines in FIGURES 2 and 3.

Various means can be used to raise and lower the top and hold it in place. The top can be merely pushed upward by exerting pressure from the inside and when it is brought to its extended position held in place by one or more struts as shown at 67. However, it is preferred to use some mechanical means for raising and lowering the top such as is shown in FIGURES 4 and 5. In FIGURE 4, a double section fluid jack 69 is shown installed at the center of the vehicle and this can be actuated by air, oil or water pressure, either applied by hand pump or by a pressurizing means on the vehicle. Since the device is located at the center of the camper, there is no tendency on the part of the top 35 to tilt as the top is raised. The jack 69 serves not only to raise the top but also to hold it in place once it is raised. In FIGURE 5 a three-sectional mechanical jack 71 is shown which also serves both to raise and lower the top as well as to hold it in place once it is up. In the embodiment illustrated in FIGURE 5, a handle 73 is used to lower and raise the top, although the jack could be operated by an electric motor or power take-off or the like. The handle 73 can be actuated by reaching into the door 61 so that it is not necessary to enter the body to raise the top.

Although the device has been described as a camper, it is obvious that it could be used as a general utility vehicle for the delivery of merchandise and also that it might be used on a trailer rather than on a pick-up truck body.

Although the sides have been described as being formed of two panels, it is obvious that the side might be broken into four or even more panels although this is generally not necessary or desirable since it adds to the weight and complexity of the structure without a corresponding increase in utility.

It is believed apparent from the foregoing that we have provided a camper body which is light, inexpensive and useful, particularly for hunters and the like.

We claim:

1. A camper intended to be mounted on a pickup truck body comprising:
   (a) a rigid, box-like member of lesser width than a pickup truck body whereby the said member may fit within the sides of a pickup truck, said member having vertical sides and ends affixed to a horizontal base;
   (b) opposed side members positioned above and hingedly connected to said box-like member and spaced farther apart than the said side members of the said box-like member, said opposed side members each consisting of a pair of panels normally vertically spaced one above the other, said panels being hinged together along an edge of each by means of horizontal hinges whereby said panels may be folded against one another about the said hinge;
   (c) front and back members normally vertically positioned above the box-like member, said front and back members each consisting of at least two normally vertically spaced panels hingedly connected along edges thereof by means of horizontal hinges; and
   (d) a generally horizontal planar top to which the topmost of each of the pair of side panels and the topmost of each of the front and back panels is connected by means of hinges, the hinges for the front and back panels being vertically spaced from the hinges for the side panels and the sizes of the side and front and back panels being such that when the said hingedly connected vertically spaced panels are folded inwardly upon one another and about the hinges on said planar top, horizontal folded panels are formed leaving a space within the said camper between the said side, front and back members sufficient to accommodate a jack.

2. The structure of claim 1 wherein a jack structure is used to extend the top.

References Cited in the file of this patent

UNITED STATES PATENTS

| | | |
|---|---|---|
| 3,000,664 | Martin | Sept. 19, 1961 |
| 3,050,331 | Mansen | Aug. 21, 1962 |
| 3,053,563 | Green | Sept. 11, 1962 |